United States Patent
Park (10) Patent No.: US 9,542,138 B2
(45) Date of Patent: Jan. 10, 2017

(54) PRINTING CONTROL APPARATUS, IMAGE FORMING APPARATUS, IMAGE FORMING SYSTEM, AND IMAGE FORMING METHOD FOR PERFORMING PRINTING IN A DIRECT WIRELESS MANNER

(71) Applicant: SAMSUNG ELECTRONICS CO., LTD., Suwon-si, Gyeonggi-do (KR)

(72) Inventor: In-Cheon Park, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/313,803

(22) Filed: Jun. 24, 2014

(65) Prior Publication Data

US 2014/0307292 A1 Oct. 16, 2014

Related U.S. Application Data (63) Continuation of application No. 12/805,330, filed on Jul. 26, 2010, now Pat. No. 8,797,574.

(30) Foreign Application Priority Data

Nov. 18, 2009 (KR) .................. 10-2009-0111522

(51) Int. Cl.
*G06F 15/00* (2006.01)
*G06F 3/12* (2006.01)
(Continued)

(52) U.S. Cl.
CPC .......... *G06F 3/1253* (2013.01); *G06F 3/1204* (2013.01); *G06F 3/1205* (2013.01); *G06F 3/1236* (2013.01);
(Continued)

(58) Field of Classification Search
CPC .... G06F 3/1236; G06F 3/1292; G06F 3/1253; H04N 2201/0039; H04N 2201/0036; H04N 2201/0053; H04N 2201/0055; H04N 2201/006; H04N 1/00413; H04N 1/00137
(Continued)

(56) References Cited

U.S. PATENT DOCUMENTS 6,725,051 B2 4/2004 Fidler
7,096,280 B2 8/2006 Aoki et al.
(Continued)

FOREIGN PATENT DOCUMENTS

JP 2004-288193 10/2004
JP 2005-110303 4/2005
(Continued)

OTHER PUBLICATIONS

Office Action mailed May 9, 2013, in co-pending U.S. Appl. No. 12/805,330 (17 pages).
(Continued)

*Primary Examiner* — Helen Q Zong
(74) *Attorney, Agent, or Firm* — Staas & Halsey LLP (57) ABSTRACT

A printing control apparatus is provided. The printing control apparatus includes a storage unit which stores at least one image, a profile generation unit which generates a profile to perform quick printing with respect to the stored image, a link forming unit which searches for at least one image forming apparatus in the vicinity of the printing control apparatus in a wireless communication manner, and forms a wireless communication link with the searched image forming apparatus, a communication interface which transmits the generated profile to the image forming apparatus with which the link is formed, and a controller which controls the communication interface to transmit an image
(Continued)

which is requested to be transmitted by the image forming apparatus with which the link is formed in response to the transmitted profile.

15 Claims, 7 Drawing Sheets (51) Int. Cl.
    H04N 1/00      (2006.01)
    H04N 1/21      (2006.01)
    H04N 101/00    (2006.01)
(52) U.S. Cl.
    CPC ......... *G06F 3/1257* (2013.01); *G06F 3/1292* (2013.01); *H04N 1/00137* (2013.01); *H04N 1/00143* (2013.01); *H04N 1/00169* (2013.01); *H04N 1/00172* (2013.01); *H04N 1/00188* (2013.01); *H04N 1/00278* (2013.01); *H04N 1/00347* (2013.01); *H04N 1/00413* (2013.01); *H04N 1/00427* (2013.01); *H04N 1/00474* (2013.01); *H04N 1/00482* (2013.01); *H04N 1/00954* (2013.01); *H04N 1/2112* (2013.01); *H04N 2101/00* (2013.01); *H04N 2201/006* (2013.01); *H04N 2201/0036* (2013.01); *H04N 2201/0037* (2013.01); *H04N 2201/0039* (2013.01); *H04N 2201/0046* (2013.01); *H04N 2201/0055* (2013.01); *H04N 2201/0084* (2013.01); *H04N 2201/0094* (2013.01)
(58) Field of Classification Search
    USPC ............................... 358/1.13–1.15
    See application file for complete search history.

(56) References Cited

U.S. PATENT DOCUMENTS

| | | | | |
|---|---|---|---|---|
| 7,221,909 | B2* | 5/2007 | Kiyose | 455/41.2 |
| 7,286,251 | B2* | 10/2007 | Tomida et al. | 358/1.15 |
| 8,571,602 | B2 | 10/2013 | Horton et al. | |
| 2002/0138557 | A1* | 9/2002 | Mukaiyama et al. | 709/203 |
| 2003/0124978 | A1* | 7/2003 | Virtanen | 455/41 |
| 2004/0066530 | A1 | 4/2004 | Wu et al. | |
| 2004/0130744 | A1 | 7/2004 | Wu et al. | |
| 2004/0252322 | A1 | 12/2004 | Gassho et al. | |
| 2005/0086282 | A1 | 4/2005 | Anderson et al. | |
| 2006/0012828 | A1* | 1/2006 | Ohta | 358/1.18 |
| 2006/0044598 | A1 | 3/2006 | Etelapera | |
| 2006/0094359 | A1* | 5/2006 | Kim | 455/41.2 |
| 2007/0024903 | A1* | 2/2007 | Kitahara et al. | 358/1.15 |
| 2007/0127069 | A1 | 6/2007 | Steele et al. | |
| 2007/0182984 | A1* | 8/2007 | Ragnet | G06Q 30/0283 358/1.15 |
| 2008/0080003 | A1 | 4/2008 | Ferlitsch et al. | |
| 2008/0144104 | A1 | 6/2008 | Do | |
| 2008/0170251 | A1 | 7/2008 | Chang et al. | |
| 2009/0066998 | A1* | 3/2009 | Kato | 358/1.15 |
| 2009/0103124 | A1* | 4/2009 | Kimura et al. | 358/1.15 |
| 2009/0132707 | A1 | 5/2009 | Mizuno | |
| 2009/0207445 | A1* | 8/2009 | Kimura | 358/1.15 |
| 2009/0268241 | A1 | 10/2009 | Choi et al. | |
| 2009/0316206 | A1* | 12/2009 | Anezaki | H04N 1/32619 358/1.15 |
| 2009/0323112 | A1* | 12/2009 | Kamei et al. | 358/1.15 |
| 2010/0005167 | A1 | 1/2010 | Kishimoto | |
| 2010/0011206 | A1* | 1/2010 | Kuroko | H04L 63/0428 713/152 |
| 2011/0058202 | A1 | 3/2011 | St. Jacques et al. | |
| 2011/0096354 | A1 | 4/2011 | Liu | |

FOREIGN PATENT DOCUMENTS

| | | |
|---|---|---|
| KR | 10-2007-0067484 | 6/2007 |
| KR | 10-2008-0054978 | 6/2008 |
| KR | 10-2009-0113013 | 10/2009 |

OTHER PUBLICATIONS

Final Office Action mailed Nov. 22, 2013 in co-pending U.S. Appl. No. 12/805,330 (16 pages).
Notice of Allowance Action mailed Mar. 18, 2014, in co-pending U.S. Appl. No. 12/805,330 (12 pages).
U.S. Appl. No. 12/805,330, filed Jul. 26, 2010, In-Cheon Park, Samsung Electronics Co., Ltd.
Korean Patent Office Action issued in Korean Patent Application No. 10-2009-0111522 dated Jul. 10, 2015 (7 total pages).
Korean Office Action dated May 18, 2016 in corresponding Korean Patent Application No. 10-2016-0008651.

* cited by examiner

| Smart Link Data Profile Format | | |
|---|---|---|
| Option Type | Value | Description |
| Auto Image Printing | On / Off | Option of automatically printing an image transmitted to the MFP |
| Auto Thumbnail / List Printing | On / Off | Option of printing a thumbnail or a list of images transmitted to the MFP |
| Auto Image Saving after Printing | On / Off | Option of automatically saving an image transmitted to the MFP after printing |
| Select Image ID for Printing | ID | Image ID for executing Auto Image Printing |
| Select Image Period for Printing | YYYY/MM/DD ~ YYYY/MM/DD | Option of transmitting and printing only an image of a specific period |
| Total Image Size | KB | Total image data size is expressed by KB unit |
| Total Image Count | 0~9999 | Number of images transmitted to the MFP |

PRINTING CONTROL APPARATUS, IMAGE FORMING APPARATUS, IMAGE FORMING SYSTEM, AND IMAGE FORMING METHOD FOR PERFORMING PRINTING IN A DIRECT WIRELESS MANNER

CROSS-REFERENCE TO RELATED APPLICATION

This application is a Continuation application of U.S. application Ser. No. 12/805,330, filed Jul. 26, 2010, and claims the benefit of priority from Korean Patent Application No. 10-2009-0111522, filed on Nov. 18, 2009, in the Korean Intellectual Property Office, the disclosures of which are incorporated herein by reference in its entirety.

BACKGROUND

1. Field

The embodiments relate to a printing control apparatus, an image forming apparatus, an image forming system, and an image forming method, and more particularly, to a printing control apparatus, an image forming apparatus, an image forming system, and an image forming method which are capable of performing auto-printing with respect to an image of the printing control apparatus if the printing control apparatus and the image forming apparatus are located near each other.

2. Description of the Related Art

An image forming apparatus generally refers to an apparatus that prints printing data generated by a terminal apparatus such as a computer on a recording medium. Examples of such image forming apparatuses include a copier, a printer, a facsimile machine or a multi function peripheral (MFP) which incorporates the functions of the aforementioned devices in a single device.

A currently widespread image forming apparatus can be connected to a terminal apparatus such as a computer through a local area network and also can be connected to diverse portable devices in diverse methods such as near field communication (NFC), WiFi, and digital living network alliance (DLNA). The image forming apparatus receives data from the diverse portable devices and performs a printing operation.

However, a system in which a user prints data using a portable device in a short-range communication method as described causes inconvenience to the user because it requires a complicated procedure. Specifically, a user must form a link between a portable device and an image forming apparatus, and then select data to be printed and input a command to print.

Also, even if a portable device uses a technology of automatically transmitting an image to an image forming apparatus, a user must go to the place where the image forming apparatus is located and input a command to print the image. Therefore, there is a demand for a method of printing an image of a portable device more easily.

SUMMARY

Accordingly, it is an aspect of the embodiments to overcome the above disadvantages and other disadvantages not described above.

It is another aspect to provide a printing control apparatus, an image forming apparatus, an image forming system, and an image forming method which are capable of performing auto-printing with respect to an image of the printing control apparatus if the printing control apparatus and the image forming apparatus are located near each other.

Additional aspects and advantages of the present invention will be set forth in the detailed description, will be apparent from the detailed description, or may be learned by practicing the invention.

The foregoing and/or other aspects are achieved by providing a printing control apparatus which is connected to at least one image forming apparatus including: a storage unit which stores at least one image, a profile generation unit which generates a profile to perform quick printing with respect to the stored image, and a link forming unit which searches for the at least one image forming apparatus in the vicinity of the printing control apparatus, and forms a communication link with the searched image forming apparatus, a communication interface which transmits the generated profile to the image forming apparatus with which the link is formed, and a controller which controls the communication interface to transmit an image which is requested to be transmitted by the image forming apparatus with which the link is formed in response to the transmitted profile.

The profile may include at least one of a list of at least one image to be printed by the quick printing and an option for the quick printing.

The option for the quick printing may include at least one of an option of printing the image, an option of saving after printing, an option of transmitting after printing, an option of printing a list, a size of the at least one image, and a number of the at least one image.

The communication interface may transmit the generated profile and the image to the image forming apparatus with which the link is formed in at least one method of NFC, WiFi, Bluetooth, and DLNA.

If an occurrence of a printing error with respect to the transmitted image is notified by the image forming apparatus with which the link is formed, the controller may control a user interface to display a message corresponding to the printing error.

The communication interface may receive at least one of apparatus information and state information of the image forming apparatus with which the link is formed from the image forming apparatus.

If the communication link is formed with the searched image forming apparatus, the storage unit may store a history of the communication link.

The foregoing and/or other aspects are achieved by providing an image forming apparatus which is connected to a printing control apparatus, including: a link forming unit which forms a communication link in response to a link forming request from the printing control apparatus, a communication interface which receives a profile to perform quick printing from the printing control apparatus with which the link is formed, a controller which controls the communication interface to request the printing control apparatus, with which the link is formed, to transmit at least one image for printing in response to the received profile; and an image forming unit which prints the at least one image based on the received profile if the at least one image is received in response to the request.

If the link is formed with the printing control apparatus, the communication interface may request the printing control apparatus to transmit the profile.

The image forming apparatus may further include a storage unit which stores a printing option for the printing control apparatus, and the image forming unit may print the received image according to the stored printing option.

The image forming apparatus may further include a profile analysis unit which controls the communication interface to transmit an error message to the printing control apparatus with which the link is formed, if it is not possible to process an image set in the profile.

The profile may include at least one of a list of at least one image to be printed by the quick printing and an option for the quick printing.

The foregoing and/or other aspects are achieved by providing an image forming method of a printing control apparatus which is connected to at least one image forming apparatus, including generating a profile to perform quick printing with respect to at least one pre-stored image, searching for the at least one image forming apparatus in the vicinity of the printing control apparatus, and forming a communication link with the searched image forming apparatus, transmitting the generated profile to the image forming apparatus with which the link is formed, and if a request for an image is received from the image forming apparatus with which the link is formed in response to the transmitted profile, transmitting the requested image to the image forming apparatus.

The profile may include at least one of a list of at least one image to be printed by the quick printing and an option for the quick printing.

The option for the quick printing may include at least one of an option of printing the image, an option of saving after printing, an option of transmitting after printing, an option of printing a list, a size of the at least one image, and a number of the at least one image.

The printing control apparatus may transmit the generated profile and the image to the image forming apparatus with which the link is formed in at least one method of NFC, WiFi, Bluetooth, and DLNA.

The image forming method may further include: receiving a notification of an occurrence of a printing error with respect to the transmitted image from the image forming apparatus with which the link is formed, and displaying a message corresponding to the printing error.

The image forming method may further include receiving at least one of apparatus information and state information of the image forming apparatus with which the link is formed from the image forming apparatus.

The image forming method may further include, if the communication link is formed with the searched image forming apparatus, storing a history of the communication link.

The foregoing and/or other aspects are achieved by providing an image forming method of an image forming apparatus which is connected to a printing control apparatus, including generating a link forming request from the printing control apparatus; forming a communication link in response to the link forming request from the printing control apparatus, receiving a profile to perform quick printing from the printing control apparatus with which the link is formed, requesting the printing control apparatus with which the link is formed to transmit at least one image for printing in response to the received profile, and, if the at least one image is received in response to the request, printing the received image based on the received profile.

The image forming method may further include, if the link is formed with the printing control apparatus, requesting the printing control apparatus to transmit the profile.

The printing operation may print the received image according to a printing option which is pre-stored for the printing control apparatus.

The image forming method may further include, if it is not possible to print an image set in the profile, transmitting an error message to the printing control apparatus with which the link is formed.

The profile may include at least one of a list of at least one image to be printed by the quick printing and an option for the quick printing.

The foregoing and/or other aspects are achieved by providing an image forming system including: a printing control apparatus which generates a profile to perform quick printing with respect to a stored image; and an image forming apparatus which forms a communication link with the printing control apparatus if the printing control apparatus is located in the vicinity of the image forming apparatus, and receives the generated profile from the printing control apparatus with which the link is formed through the link, and the image forming apparatus requests the printing control apparatus to transmit an image for printing according to the received profile, and if the image is received in response to the request, the image forming apparatus prints the received image.

The profile may include at least one of a list of at least one image to be printed by the quick printing and an option for the quick printing.

BRIEF DESCRIPTION OF THE DRAWINGS

The above and/or other aspects will be more apparent by describing in detail exemplary embodiments thereof, with reference to the accompanying drawings in which.

DETAILED DESCRIPTION

Reference will now be made in detail to the embodiments, examples of which are illustrated in the accompanying drawings, wherein like reference numerals refer to like elements throughout.

Figure 1:
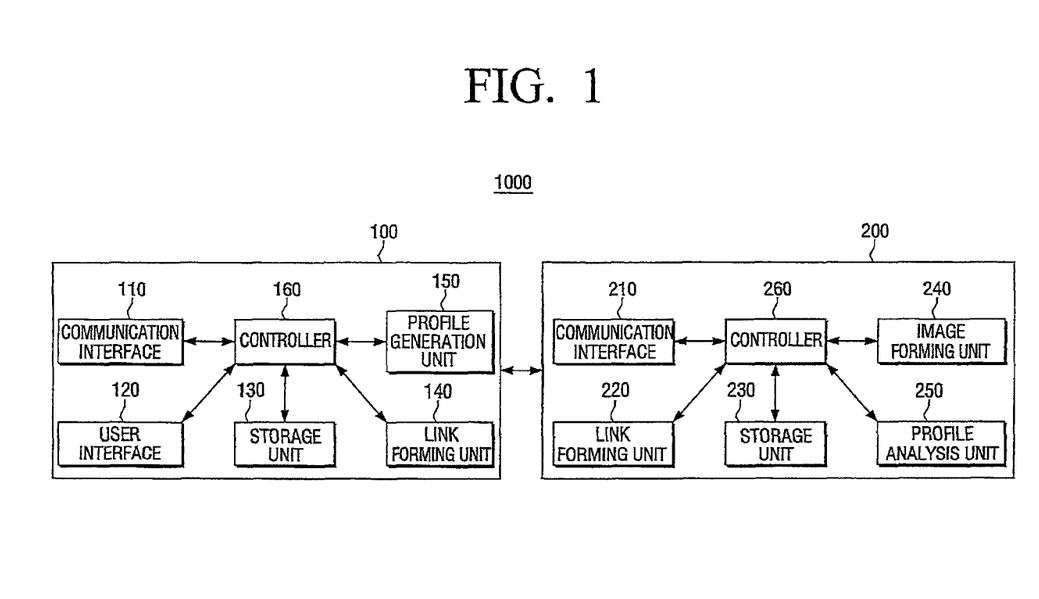
FIG. 1 is a block diagram illustrating an image forming system according to an exemplary embodiment.

FIG. 1 is a block diagram illustrating an image forming system according to an exemplary embodiment.

Referring to FIG. 1, an image forming system 1000 includes a printing control apparatus 100 and an image forming apparatus 200.

The printing control apparatus 100 is connected to at least one image forming apparatus, for example, in a wireless communication manner, and generates a profile to perform 'quick printing' (or 'auto printing') with respect to a stored image, forms a wireless communication link with at least one image forming apparatus located in the vicinity thereof, and transmits the profile to the image forming apparatus. The printing control apparatus 100 receives from the linked image forming apparatus a request to transmit an image to the image forming apparatus in response to the profile, and transmits the image to the image forming apparatus.

The printing control apparatus 100 described herein refers to an apparatus that can exchange data with the image forming apparatus 200 in a method such as near field communication (NFC), WiFi, Bluetooth, and digital living network alliance (DLNA), and may be a portable apparatus such as a portable camera, a mobile phone, a portable camcorder, an MP3, player, or a portable multimedia player (PMP).

More specifically, as shown in FIG. 1, the printing control apparatus 100 includes a communication interface 110, a user interface 120, a storage unit 130, a link forming unit 140, a profile generation unit 150, and a controller 160.

The communication interface 110 exchanges data with the image forming apparatus 200. More specifically, the communication interface 110 is connected to the image forming apparatus 200 in diverse communication methods such as NFC, WiFi, Bluetooth, and DLNA, and transmits a profile which is generated by the profile generation unit 150 and an image which is stored in the storage unit 130 to the image forming apparatus 200.

The communication interface 110 periodically checks whether an accessible image forming apparatus exists within a predetermined distance or not. More specifically, the communication interface 110 checks whether an accessible image forming apparatus exists within a predetermined distance of the printing control apparatus 100 periodically or in response to a request from a user.

The communication interface 110 receives apparatus information and state information of the image forming apparatus 200 from the image forming apparatus. The communication interface 110 may receive notification of a printing error which occurs with respect to a transmitted image from the image forming apparatus 200. More specifically, information of the printing error may be transmitted with the state information of the image forming apparatus 200.

The link forming unit 140 forms a wireless communication link if an image forming apparatus is searched within a predetermined distance. More specifically, if an image forming apparatus is searched within a predetermined distance through the communication interface 110, the link forming unit 140 determines whether the searched image forming apparatus has a history of having been already accessed or not, using pre-stored link information, and forms a wireless communication link with the image forming apparatus using the pre-stored link information if the image forming apparatus is determined to have the history of having been already accessed. The link may be formed in a different method depending on a communication method supported by the printing control apparatus 100, and the method for forming a link according to a communication method is well known to an ordinary skilled person in the related art and thus detailed description thereof is omitted.

The user interface 120 has a plurality of function keys to allow a user to set or select diverse functions supported by the printing control apparatus 100, and displays diverse pieces of information provided by the printing control apparatus 100. The user interface 120 may be realized as a device which realizes input and output simultaneously such as a touch pad, or as a device which combines the functions of a mouse and a monitor.

The user interface 120 may display an image forming apparatus that can be connected to the printing control apparatus 100. More specifically, if an accessible image forming apparatus is searched through the communication interface 110, the user interface 120 may display the accessible image forming apparatus. At this time, the user interface 120 may preferentially display an image forming apparatus which has a history of having been already accessed. The above operation may be performed only if there is no image forming apparatus which has a history of having been already accessed.

Also, if an image forming apparatus is selected by a user, the user interface 120 may display a UI window to receive diverse pieces of information which are necessary to form a link with the selected image forming apparatus. More specifically, the user interface 120 may receive information necessary to form a link, such as a user ID, a password, and an authentication number, from the user, and may store the information in the storage unit 130. Meanwhile, if the image forming apparatus selected by the user has a history of having been already accessed, that is, if the information necessary to form a link with the image forming apparatus is pre-stored in the storage unit 130, the above operation may be omitted.

Also, if an image forming apparatus 200 having a history of having been already accessed is searched, the user interface 120 may receive confirmation regarding whether the user wishes to perform quick printing or not. However, this operation may be omitted.

The user interface 120 may receive setting of a condition regarding the profile. More specifically, the user interface 120 may display a UI window including a first area to receive a condition to select an image for quick printing from among stored images, and a second area to set an option for quick printing. The UI window displayed on the user interface 120 will be described below with reference to FIG. 3.

The user interface 120 may display an error message which is received from the image forming apparatus 200. More specifically, if an error which has occurred with respect to an image at the image forming apparatus 200 is notified through the communication interface 110, the user interface 120 may display an error message corresponding to the error.

The storage unit 130 stores an image. Also, the storage unit 130 may store a setting value for a profile which is set by the user through the user interface 120, and store the profile which is generated by the profile generation unit 150. Also, the storage unit 130 may store information regarding the image forming apparatus which has the history of having been already accessed. More specifically, the storage unit 130 may store the history of the wireless communication link which is formed with the image forming apparatus searched through the communication interface 110. The storage unit 130 may be realized as an internal storage medium or an external storage medium of the printing control apparatus 100, for example, a removable disk including a Universal Serial Bus (USB) memory.

The profile generation unit 150 generates a profile to perform quick printing with respect to a stored image. More specifically, the profile generation unit 150 may generate a list of images for quick printing corresponding to the 'condition to select an image for quick printing' which is input through the user interface 120, and generate a profile based on the list of images and a selected 'option for quick printing'.

The profile recited herein refers to information that includes information of the list of at least one image for quick printing and information of the 'option for quick printing' ('option for quick printing' may indicate 'a method for processing an image of an image forming apparatus'. Two terms are interchangeably used but have the same meaning).

The controller 160 controls the respective components of the printing control apparatus 100. More specifically, if an image forming apparatus is searched through the communication interface 110, the controller 160 determines whether the searched image forming apparatus has a history of having been already accessed or not using the link forming unit 140. If the searched image forming apparatus has the history of having been already accessed, the controller 160 may control the link forming unit 140 to form a link with the searched image forming apparatus and may control the profile generation unit 150 to generate a profile to perform quick printing. In this embodiment, the profile is generated after the image forming apparatus which has the history of having been already accessed is searched. However, the profile may be generated before the image forming apparatus is searched.

Also, if the link is formed with the searched image forming apparatus, the controller 160 may control the communication interface 110 to transmit the generated profile. Also, if a request for an image is received through the communication interface 110 in response to the profile, the controller 160 may control the communication interface 110 to transmit the image requested by the image forming apparatus 200.

Also, if the link is formed with the searched image forming apparatus for the first time, the controller 160 may store the history of the wireless communication link in the storage unit 130. Based on this history, the printing control apparatus 100 can determine whether a searched image forming apparatus has a history of having been already accessed or not.

Also, if an error message is received from the image forming apparatus 200, the controller 160 may control the user interface 120 to display the error message.

As described above, if the image forming apparatus 200 having the history of having been already accessed is searched within a predetermined distance, the printing control apparatus 100 automatically forms a link and automatically transmits a profile and an image according to a pre-set condition so that the user can print an image of the printing control apparatus 100 more easily.

The image forming apparatus 200 is accessible to at least one printing control apparatus 100, and forms a wireless communication link with the printing control apparatus 100 if the printing control apparatus 100 is located within a predetermined distance and receives a profile through the link. The image forming apparatus 200 analyzes the profile and requests the printing control apparatus 100 to transmit an image to be printed according to the analyzed profile. If the image is received in response to the request, the image forming apparatus 200 prints the image.

The image forming apparatus 200 is an apparatus which exchanges data with the printing control apparatus 100 in diverse methods such as NFC, WiFi, Bluetooth, and DLNA, and for example, may be a printer, a facsimile machine, a scanner and a MFP which incorporates the functions of the aforementioned devices in a single device.

More specifically, the image forming apparatus 200 includes a communication interface 210, a link forming unit 220, a storage unit 230, a profile analysis unit 250, an image forming unit 240, and a controller 260.

The communication interface 210 exchanges data with the printing control apparatus 100. More specifically, the communication interface 210 may be connected to the printing control apparatus 100 in various communication methods such as NFC, WiFi, Bluetooth, and DLNA, and may receive a profile which is generated by the printing control apparatus 100.

Also, the communication interface 210 periodically checks whether a printing control apparatus exists within a predetermined distance. More specifically, the communication interface 210 may check whether an accessible printing control apparatus 100 exists within a predetermined distance of the image forming apparatus 200 or not, periodically or in response to a request from a user.

The communication interface 210 may request the searched printing control apparatus 100 to transmit a profile. In this embodiment, the image forming apparatus 200 requests the printing control apparatus 100 to transmit a profile and the printing control apparatus 100 transmits the profile in response to the request from the image forming apparatus 200. However, once a link is formed, the printing control apparatus 100 may automatically transmit the profile without receiving a request for the profile from the image forming apparatus 200.

If a request for apparatus information and state information is received from the linked printing control apparatus 100, the communication interface 210 may transmit the apparatus information and the state information in response to the request. The apparatus information includes an apparatus name, a performable function, and a printing option of the image forming apparatus 200, and the state information indicates whether the image forming apparatus 200 is in a state in which printing is possible, a standby state, or a state in which printing is being performed. Also, if an error occurs while an image received from the printing control apparatus 100 is being printed, the communication interface 210 may notify the printing control apparatus 100 of the occurrence of the error. The occurrence of the error may be transmitted with the above-described state information.

The link forming unit 220 forms a link if a printing control apparatus having a history of having been already accessed is searched within a predetermined distance. More specifically, if a printing control apparatus is searched through the communication interface 210, the link forming unit 220 determines whether the searched printing control apparatus has a history of having been already accessed or not using pre-stored link information, and forms a link with the searched printing control apparatus using the pre-stored link information if the searched printing control apparatus has the history of having been already accessed. The link may be formed in a different method depending on a communication method supported by the image forming apparatus 200. The method for forming a link according to a communication method is well known to an ordinary skilled person in the related art and thus detailed description thereof is omitted. In this embodiment, both the image forming apparatus 200 and the printing control apparatus 100 search a counter apparatus. However, in another embodiment, only one of the two apparatuses may search a counter apparatus.

The storage unit 230 stores a received image. More specifically, the storage unit 230 may store an image which is received through the communication interface 210 based on a profile which is analyzed by the profile analysis unit 250. For example, if the option "saving after printing" is set in the profile received from the printing control apparatus 100, the storage unit 230 may store the image received through the communication interface 210. The storage unit 230 may be realized as an internal storage medium or an external storage medium of the image forming apparatus 200, for example, a removable disk including a USB memory.

The storage unit 230 may store information of the printing control apparatus 100 having the history of having been already accessed. The storage unit 230 may store a printing option for the printing control apparatus having the history of having been already accessed. More specifically, the storage unit 230 may store an output option for a received image, such as 2-up printing and a duplex-printing. In this embodiment, the image forming apparatus 200 pre-stores a printing option for an image. However, the printing option may be included in the profile and the storage unit 230 may store the printing option included in the profile as a printing option for a corresponding apparatus.

The profile analysis unit 250 analyzes a received profile. More specifically, the profile analysis unit 250 analyzes a list of at least one image for quick printing and a method of processing the image of the image forming apparatus 200 (that is, an option for quick printing), which are set in the profile received through the communication interface, and analyzes whether it is possible to perform printing according to the received profile. For example, if the profile includes 10 images to be printed but the image forming apparatus 200 has insufficient toner to process the 10 images, that is, has a toner capable of processing only 2 or 3 images, or if the option 'saving after printing' is set in the profile but the storage unit 230 of the image forming apparatus 200 has a capacity to store only 3-4 images, the profile analysis unit 250 determines that it is not possible to print the corresponding image.

Also, the profile analysis unit 250 may request the printing control apparatus 100 to transmit an image for quick printing based on the analyzed profile. More specifically, the profile analysis unit 250 may request the printing control apparatus 100 to transmit an image for quick printing set in the profile through the communication interface 210.

The image forming unit 240 prints a received image. More specifically, the image forming unit 250 may print the image received through the communication interface 210 according to the option set in the profile. Also, if a printing option for the printing control apparatus 100 is pre-stored, the image forming unit 250 applies the pre-stored printing option to the image and prints the image. Also, if the option 'thumbnail printing' or 'list printing' is set in the profile, the image forming unit 250 may output a thumbnail or a list for the image.

The controller 260 controls the respective components of the image forming apparatus 200. More specifically, if the printing control apparatus 100 has a history of having been already accessed is searched within a predetermined distance, the controller 260 controls the link forming unit 220 to form a link with the searched printing control apparatus 100. Also, the controller 260 may control the communication interface 210 to request the linked printing control apparatus 100 to transmit a profile, and, if the profile is received through the communication interface 210 in response to the request, the controller 260 may control the profile analysis unit 240 to analyze the profile and to receive an image set in the profile.

Also, if an image is received through the communication interface 210, the controller 260 may control the image forming unit 240 to print the image based on the analyzed profile. Also, if the option 'thumbnail printing' or 'list printing' is set in the analyzed profile, the controller 260 may control the image forming unit 240 to output a thumbnail or list for the image.

If the option 'saving after printing' is set in the profile, the controller 260 may control the storage unit 230 to store the image. In this case, the image may be stored in the same name as that of the printing control apparatus 100 or in a different name according to a pre-set algorithm.

As described above, if the printing control apparatus 100 is located with a predetermined distance, the image forming apparatus 200 automatically forms a link and receives a profile, and requests an image according to the profile and prints the image. Accordingly, the printing can be performed simply by locating the printing control apparatus 100 near to the image forming apparatus 200.

Although only an image of the printing control apparatus 100 is a target to be printed in the embodiment of FIG. 1, the image may be an image file of Joint Photographic Experts Group (JPG or JPEG), Bitmap (BMP), Tagged Usage File Format (TIFF) or a file which can be printed by direct printing by the image forming apparatus 200. The direct-printing recited herein refers to a method in which a printing job is performed simply by transmitting a corresponding file to an image forming apparatus without additional file conversion, and JPG, Portable Document Format (PDF), and Extensible Markup Language (XML) Paper Specification (XPS) files are examples of a file that can be printed by direct printing.

Figure 2:
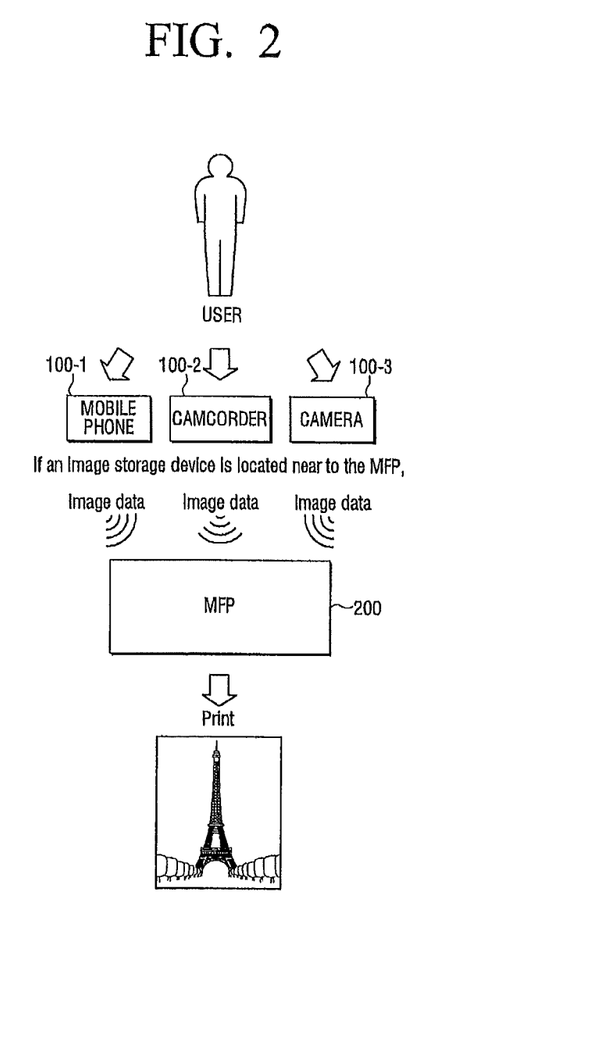
FIG. 2 is a view provided to explain an image forming method according to an exemplary embodiment.

FIG. 2 is a view provided to explain an image forming method according to an exemplary embodiment of the present invention.

Referring to FIG. 2, if a user locates a printing control apparatus 100-1, 100-2, 100-3 in the vicinity of an image forming apparatus 200, a link is automatically formed between the printing control apparatus 100-1, 100-2, 100-3 and the image forming apparatus 200 and a profile generated by the printing control apparatus 100-1, 100-2, 100-3 is transmitted to the image forming apparatus 200 through the link.

If the profile is transmitted to the image forming apparatus 200, the image forming apparatus 200 analyzes the profile and requests the printing control apparatus 100-1, 100-2, 100-3 to transmit an image for quick printing. If the image is received in response to the request, the image forming apparatus 200 prints the image.

As shown in FIG. 2, since a specific image is printed simply by locating the printing control apparatus 100-1, 100-2, 100-3 in the vicinity of the image forming apparatus 200, user's convenience can be improved.

Figure 3:
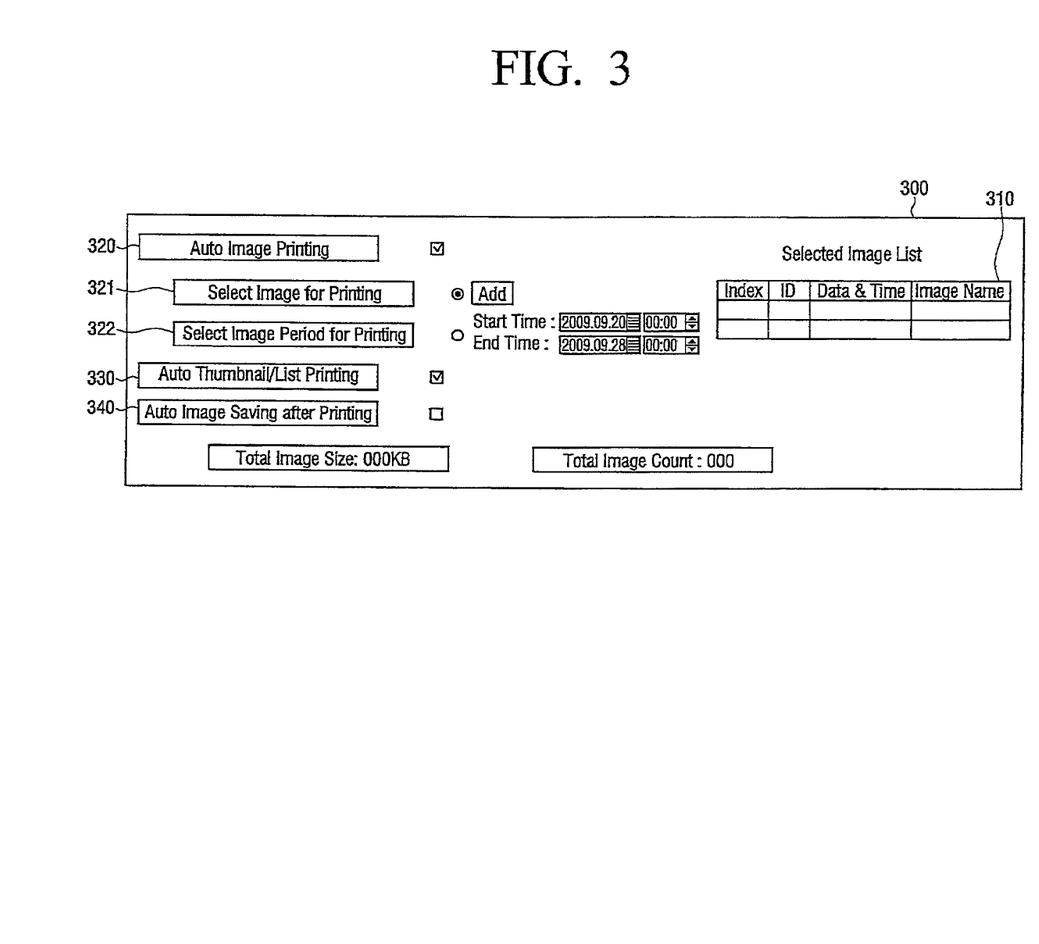
FIG. 3 is a view illustrating an example of a user interface (UI) window displayed on a user interface of a printing control apparatus according to an exemplary embodiment.

FIG. 3 is a view illustrating an example of a UI window displayed on a user interface of a printing control apparatus according to an exemplary embodiment.

Referring to FIG. 3, a UI window 300 includes a first area 320 to receive a 'condition to select an image for quick printing', a second area 330, 340 to set an option for quick printing, and a third area 310 to display a list of images corresponding to the selected condition.

More specifically, the first area 320 is to receive a 'condition to select an image for quick printing'. The user individually selects an image for quick printing by selecting an area 321 'select image for printing', and selects an image within a predetermined period by selecting an area 322 'select image period for printing' and inputting a predetermined period.

The third area 310 is to display an image corresponding to the condition input by the user through the first area 320 in the format of a table.

The second area 330, 340 is to select an option for quick printing, and includes an option 330 of outputting a thumbnail or a list for the image for quick printing and an option 340 of 'saving after printing' for the image for quick printing.

If the user inputs the condition for the profile using the UI window 300 described above, the storage unit 130 stores the condition input by the user and the profile generation unit 150 generates a profile according to the profile condition input by the user.

Figure 4:
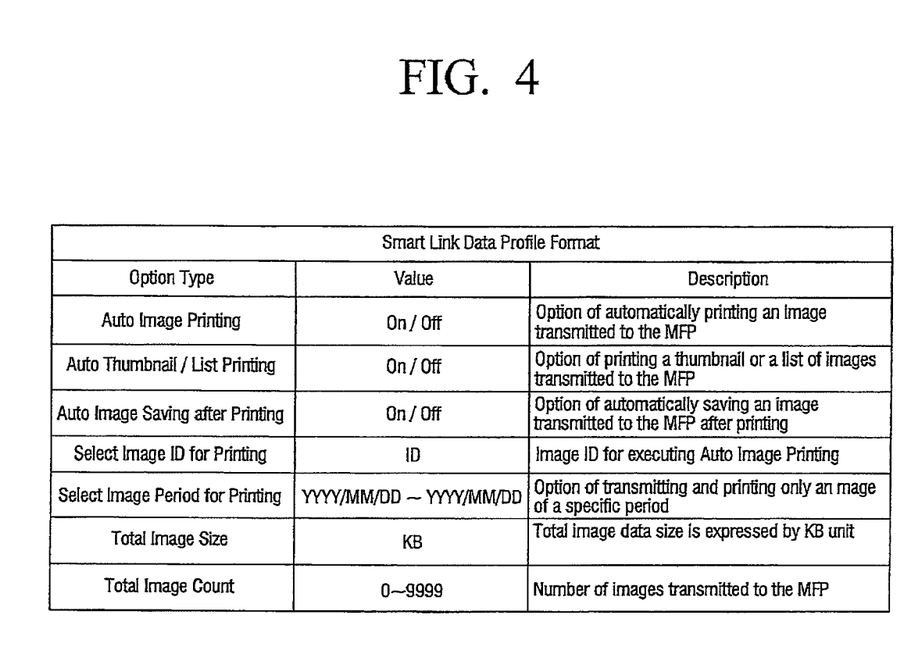
FIG. 4 is a view illustrating an example of an option of a profile.

FIG. 4 is a view illustrating an example of a profile according to an exemplary embodiment.

Referring to FIG. 4, a profile generated according to an exemplary embodiment of the present invention may include information regarding whether to perform quick printing or not, information regarding whether to output a thumbnail and a list for a transmitted image, information regarding whether to store a transmitted image in an image forming apparatus, information regarding an image to be transmitted, information regarding whether to print only an image corresponding to a specific period, information regarding a total size of a transmitted image, and information regarding the number of images to be transmitted. Some information may be omitted and additional information may be included.

Figure 5:
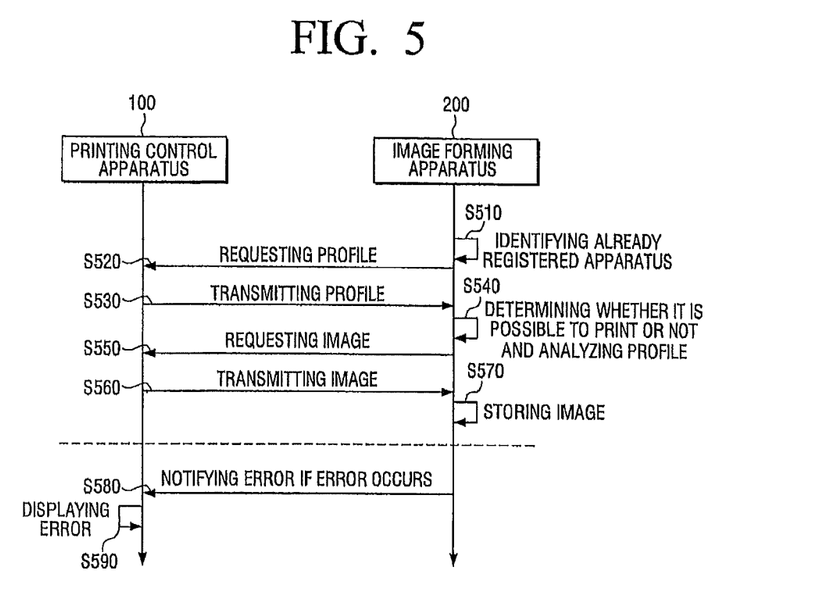
FIG. 5 is a view illustrating an image forming method according to an exemplary embodiment.

FIG. 5 is a view illustrating an image forming method according to an exemplary embodiment.

Referring to FIG. 5, if the printing control apparatus 100 is located within a predetermined distance, an image forming apparatus 200 identifies whether the printing control apparatus 100 has been already registered or not (S510), and a link is formed between the printing control apparatus 100 and the image forming apparatus 200.

Once the link is formed, the image forming apparatus 200 requests the printing control apparatus 100 to transmit a profile (S520). In response to the request, the printing control apparatus 100 generates a profile and transmits the profile or transmits a pre-stored profile to the image forming apparatus 200 (S530). In this embodiment, the printing control apparatus 100 transmits the profile in response to the request from the image forming apparatus 200. However, the printing control apparatus 100 may transmit the profile without receiving a request for a profile from the image forming apparatus 200.

If the profile is transmitted to the image forming apparatus 200, the image forming apparatus 200 analyzes the profile and determines whether it is possible to perform quick printing or not (S540). If it is determined that it is possible to perform quick printing, the image forming apparatus 200 requests the printing control apparatus 100 to transmit an image set in the profile (S550). In response to the request, the printing control apparatus 100 transmits the requested image to the image forming apparatus 200 and the image forming apparatus 200 prints the image. At this time, if the printing option 'saving after printing' is set in the profile, the image may be stored.

In this embodiment, the image forming apparatus 200 requests only the image set in the profile and the printing control apparatus 100 transmits only the requested image (S560). However, the printing control apparatus 100 may transmit all images stored in the printing control apparatus 100 (S570) to the image forming apparatus along with the profile and the image forming apparatus 200 may print only the image set in the profile. However, it is understood that the error message may be output as a sound or light. These are just examples, and the error messages are not limited to these examples.

If an error occurs in the image forming apparatus 200 during a printing operation, the image forming apparatus 200 notifies the printing control apparatus 100 of the occurrence of the error (S580), and the printing control apparatus 100 displays an error message (S590).

Figure 6:
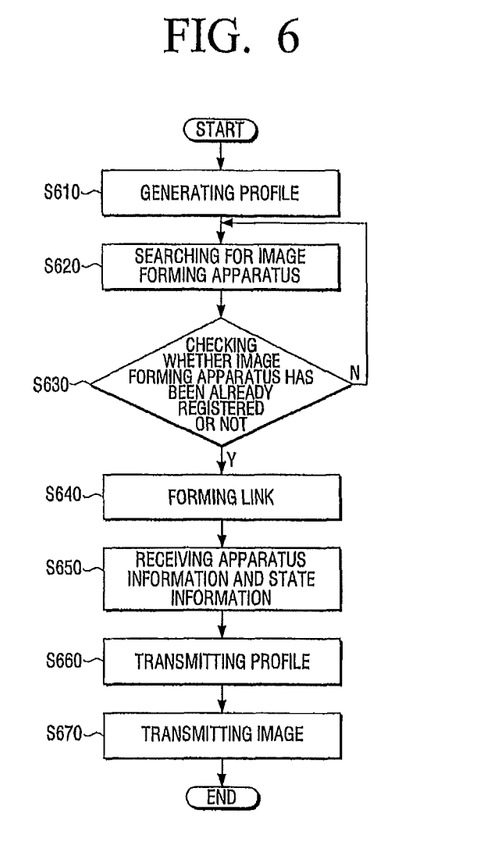
FIG. 6 is a flowchart illustrating an image forming method of a printing control apparatus according to an exemplary embodiment.

FIG. 6 is a flowchart illustrating an image forming method of a printing control apparatus 100 according to an exemplary embodiment.

A condition to select an image for quick printing and an option for quick printing are pre-set by a user, and a profile for at least one pre-stored image is generated according to the pre-set condition and the option (S610). More specifically, a list of an image for quick printing is generated according to the condition pre-set by the user and a profile is generated based on the list of the image and the option pre-set by the user.

Also, the printing control apparatus 100 searches for an image forming apparatus located in the vicinity thereof (S620), and, if the searched image forming apparatus has a history of having been already accessed (S630), the printing control apparatus 100 forms a link with the searched image forming apparatus (S640).

Once the link is formed with the searched image forming apparatus 200, the printing control apparatus 100 receives apparatus information and state information regarding the searched image forming apparatus (S650), and transmits the generated profile to the searched image forming apparatus (S660). The generated profile may be transmitted only if there is a request to transmit the profile from the image forming apparatus 200.

If a request for an image is received from the image forming apparatus 200 in response to the profile, the printing control apparatus 100 transmits the requested image to the image forming apparatus 200 (S670).

According to the image forming method described above, the profile and the image for quick printing are automatically transmitted to the image forming apparatus 200 so that the user can perform the printing operation with respect to the image more easily. The image forming method of FIG. 6 may be executed in the printing control apparatus 100 having the configuration of FIG. 1 and may be also executed in a printing control apparatus having a different configuration.

Figure 7:
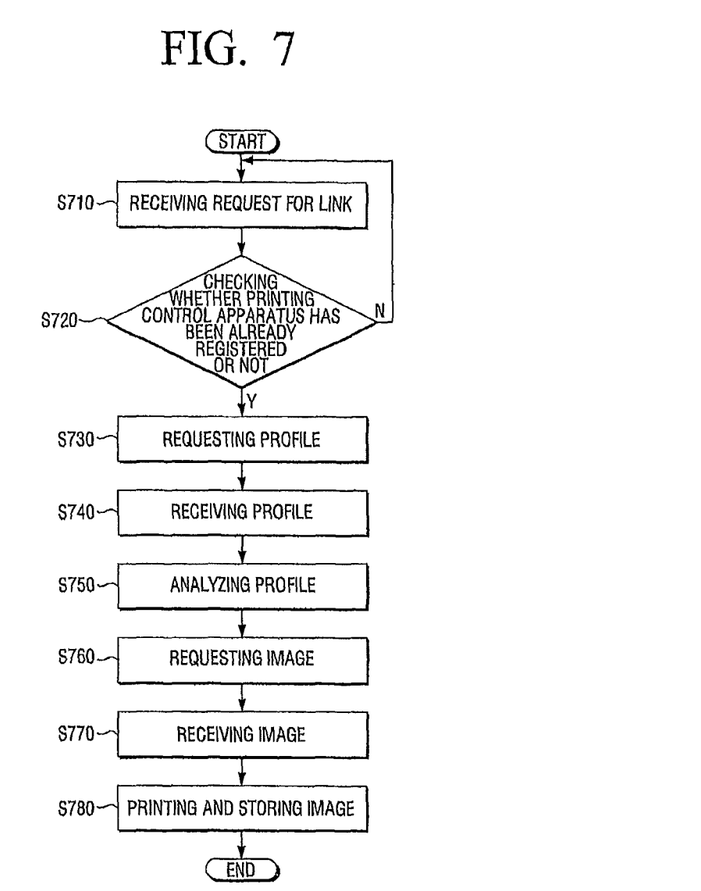
FIG. 7 is a flowchart illustrating an image forming method of an image forming apparatus according to an exemplary embodiment.

FIG. 7 is a flowchart illustrating an image forming method of an image forming apparatus according to an exemplary embodiment.

If a request to form a link is received from the printing control apparatus 100, the image forming apparatus 200 determines whether the printing control apparatus 100 (S710), which has requested to form a link, has a history of having been already accessed (S720), and forms a link if the printing control apparatus 100 has the history of having been already accessed.

The image forming apparatus 200 requests the linked printing control apparatus 100 to transmit a profile (S730). If the profile is received from the printing control apparatus 100 in response to the request for the profile (S740), the image forming apparatus 200 analyzes the profile (S750) and requests the printing control apparatus 100 to transmit an image for quick printing according to the profile (S760).

If the image is received from the printing control apparatus 100 in response to the request for image (S770), the image forming apparatus 200 performs printing with respect to the image (S780). If the option 'saving after printing' is set in the profile, the received image is stored, and, if the option 'thumbnail printing' or 'list printing' is set in the received profile, a thumbnail or a list for the received image is printed.

According to the image forming method as described above, the image forming apparatus 200 automatically receives the image and the profile from the printing control apparatus 100 and performs printing with respect to the image according to the profile, so that user's convenience can be improved. The image forming method of FIG. 7 may be executed in the image forming apparatus 200 having the configuration of FIG. 1 and may be also executed in an image forming apparatus having a different configuration.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A printing control apparatus which is connectable to an image forming apparatus using wireless communication, the printing control apparatus comprising:
    a communication interface;
    a user interface (UI) configured to display an interface for receiving a setting for auto printing; and
    at least one hardware processor configured to:
        receive from the UI a selection of a printing option and an image to be printed before the communication interface of the printing control apparatus is within a distance where communication with the image forming apparatus is possible;
        determine that the communication interface of the printing control apparatus is within the distance where communication with the image forming apparatus is possible;
        in response to the determination, automatically control the communication interface to form the wireless communication link with the image forming apparatus using one or more of NFC communication and Wi-Fi communication;
        in response to forming the wireless communication link, automatically control the communication interface to transmit, using the wireless communication link, the selected image and the selected printing option to the image forming apparatus, such that the selected image is automatically printed after forming the wireless communication link; and
        in response to an error message with respect to the transmitted image being received through the wireless communication link from the image forming apparatus, control the UI to display a message corresponding to the received error message.

2. The printing control apparatus of claim 1, wherein when the printing control apparatus is within the distance where the NFC communication with the image forming apparatus is possible, the printing control apparatus exchanges connection information to form the wireless communication link with the image forming apparatus.

3. The printing control apparatus of claim 1, wherein the UI displays a UI window for receiving connection information to form the wireless communication link.

4. The printing control apparatus of claim 1, wherein the printing control apparatus searches for the image forming apparatus in the vicinity of the printing control apparatus, and displays a search result on the UI.

5. The printing control apparatus of claim 4, wherein when the searched for image forming apparatus is selected, the wireless communication link is formed with the selected image forming apparatus.

6. The printing control apparatus of claim 1, wherein the UI displays the image forming apparatus with a history of being connected to the printing control apparatus.

7. The printing control apparatus of claim 6, wherein when an image forming apparatus with the history of being connected is selected through the user interface, the wireless communication link is formed with the selected image forming apparatus based on pre-stored connection information.

8. The printing control apparatus of claim 1, wherein the communication interface transmits the selected image and the selected printing option to the image forming apparatus through a Wi-Fi network.

9. The printing control apparatus of claim 1, wherein in response to the auto printing being set through the first UI window respect to the selected image, the communication interface transmits the selected image and the selected printing option to the image forming apparatus at a same time that the wireless communication link is formed.

10. The printing control apparatus of claim 1, wherein the printing control apparatus periodically searches for the image forming apparatus in the vicinity of the printing control apparatus.

11. The printing control apparatus of claim 1, wherein the printing control apparatus is one or more of a mobile phone, a portable camera, a portable camcorder, an MP3 player, and a portable multimedia player (PMP).

12. The printing control apparatus of claim 1, wherein the user interface is a touch pad.

13. An image forming method in a printing control apparatus which is connectible to an image forming apparatus, the method comprising:
    displaying a user interface (UI) for receiving a setting for auto printing printed before the communication interface of the printing control apparatus is within a distance where communication with the image forming apparatus is possible;
    determining that the communication interface of the printing control apparatus is within the distance where communication with the image forming apparatus is possible;
    receiving a selection of a printing option and an image to be printed;
    in response to the determination, automatically forming a wireless communication link with an image forming apparatus using one or more of NFC communication and Wi-Fi communication;
    in response to the automatic forming of the wireless communication link, automatically control the communication interface to transmitting, using the wireless communication link, the selected image and the selected printing option to the image forming apparatus, such that the selected image is automatically printed after forming the wireless communication link; and
    in response to an error message with respect to the transmitted image being received through the wireless communication link from the image forming apparatus, displaying a message corresponding to the received error message.

14. A non-transitory computer readable storage medium for storing instructions to control a printing control apparatus which is connectible to at least one image forming apparatus in a wireless communication manner to perform an image forming method, the method comprising:
    displaying a user interface (UI) for receiving a setting of auto printing;

receiving a selection of a printing option and an image to be printed before the communication interface of the printing control apparatus is within a distance where communication with the image forming apparatus is possible;

determining that the communication interface of the printing control apparatus is within the distance where communication with the image forming apparatus is possible;

in response to the determination, automatically forming a wireless communication link with an image forming apparatus using one or more of NFC communication and Wi-Fi communication;

in response to the automatic forming of the wireless communication link, automatically transmitting, using the wireless communication link, the selected image and the selected printing option to the image forming apparatus, such that the selected image is automatically printed after forming the wireless communication link; and in response to an error message with respect to the transmitted image being received through the wireless communication link from the image forming apparatus, displaying a message corresponding to the received error message.

15. The printing control apparatus of claim 1, wherein the hardware processor is further configured to:

in response to the determination, identify whether the image forming apparatus was previously registered by the printing control apparatus;

if the image forming apparatus is not identified as being previously registered by the printing control apparatus, preventing the communication interface from forming the wireless communication link with the image forming apparatus.

* * * * *